United States Patent Office 3,162,547
Patented Dec. 22, 1964

3,162,547
SECONDARY DEOXIDIZER FOR ALUMINUM AND ITS ALLOYS
Earl W. Kendall, San Diego, Calif., assignor to Rohr Corporation, Chula Vista, Calif., a corporation of California
No Drawing. Filed July 31, 1961, Ser. No. 127,852
2 Claims. (Cl. 134—3)

This invention relates generally to chemical cleaning and deoxidizing compositions for cleaning aluminum and its alloys to reduce surface electrical resistance to a value at or below that required for satisfactory spot welding, such value being of the order of 100 microohms or less.

More specifically, the present invention is directed to a secondary deoxidizer which may be used to reduce the surface electrical resistance after a period of storage, shipping, or other period of inactivity following application of a primary etch employed to prepare the materials for subsequent spot welding. When the spot welding has been delayed in order to prepare and fabricate other detailed parts and sub-assemblies, for example, the secondary deoxidizer is employed to restore the initial reduction in surface resistance. The materials may be stored after primary etch up to a period of six months before the spot welding of such parts may actually take place. By virtue of the reoxidation characteristics of aluminum and its alloys after primary etching, however, the surface resistance requirements for satisfactory spot welding of such materials may be exceeded in a relatively short period of time.

Although there are satisfactory primary etches and cleaners such, for example, as those disclosed and claimed in my copending applications for Process and Composition for Treating Aluminum Alloys, Serial No. 709,422, filed January 17, 1958, now abandoned, and Process and Composition for Cleaning and Polishing Aluminum and Its Alloys, Serial No. 812,369, filed May 11, 1959, now U. S. Patent No. 3,106,499, either of which compositions and methods are well adapted to reduce the surface electrical resistance below something of the order of 5 microohms, these primary pre-spot weld etchant compositions normally require that the spot welding be accomplished within 24 hours of the primary application. Where the parts have been subjected to the primary etch as details, and then formed within the allotted time into sub-assemblies by spot welding no problem arises. When the sub-assemblies subsequently are returned to the assembly area for final spot weld assembly, however, the permissive time delay between primary chemical cleaning and spot welding is usually exceeded and, as a result, the parts have excessively high surface resistance. The sub-assemblies so formed, moreover, cannot again be immersed into the primary etch for the reason that the sub-assemblies inherently have faying surfaces and the insidious primary etch material entrapped therein cannot be flushed out of such surfaces. Accordingly, in order to deoxidize sub-assemblies for the final spot weld assembly, the chemical cleaning solution is applied by hand only to those areas where welding is to be performed.

Heretofore, hand-applied secondary etches have included such materials as hydrofluoric, hydrofluosilicic, or phosphoric acids which, being etchant, require a pre-cleaner and large amounts of water for rinsing. These acids, moreover, are toxic and may cause serious damage and injury, particularly when brought into contact with sensitive tissues, such as in the eyes. To be entirely satisfactory, a secondary cleaning material should be non-toxic whether taken accidentally internally as by breathing the fumes or through contacting with the hands of the operator. These prior art secondary etches are also objectionable in that they attack the basic metal and thus produce a resultant etching action which is manifested by discoloring effects in the hand-treated areas.

An object of the present invention is to provide a new and improved secondary chemical composition and process for cleaning of aluminum and its alloys preparatory to spot welding.

Another object is to provide a secondary deoxidizer for cleaning aluminum and its alloys which is in the form of an aqueous solution and may be applied by hand to the parts to be cleaned.

Another object is to provide a secondary deoxidizer which may be operated at ambient temperature of the order of 65° to 90° F. in a simple swabbing and subsequent wipe-off operation to remove the surface contaminants and oxides to thus effect a low order of surface electrical resistance preparatory to spot welding.

Another object is to provide a hand-applied secondary deoxidizer in the form of a non-etching, non-toxic aqueous solution capable of reducing the surface resistance of the parts cleaned to below 100 microohms.

Another object is to provide a secondary deoxidizer which will not produce coloring effects due to etching action such that the area where the solution is applied can be identified.

Another object is to provide a secondary deoxidizer which is non-toxic and may be applied by hand without harmful effects to the material being cleaned or to the operator applying the solution.

Still another object is to provide a secondary deoxidizer which may be applied and removed by hand without requiring a flooding of the parts with water for rinsing.

Yet another object is to provide a secondary deoxidizer which will leave a protective film to prevent subsequent reoxidation of the treated surface.

Still other objects, features and advantages of the present invention will become more fully apparent as the description proceeds.

In accordance with the method and composition of the present invention, hereinafter designated RK–3W, the low order of surface electrical resistance accomplished through the use of the primary etch, but increased to an unsatisfactory level by reason of the oxidation which may have occurred during a period of storage or inactivity of the materials to be treated, is restored to previous low value by application of the secondary deoxidizer of the present invention to the surface of such materials, all in a form and in a manner presently to appear. This secondary deoxidizer preferably is in the form of an aqueous composition material which can be swabbed over the surface areas which require spot welding, and preferably is used with the composition operating at ambient temperature of the order of 65° to 90° F. To this end, the secondary deoxidizer process merely requires a swabbing of the material onto the surface as through use of a sponge, brush, rag, or toweling, and then a simple drying with clean toweling, or a clean rag, at which time the spot welding may take place. Preferably, the order of steps is to swab the material to form a film which is permitted to remain on the surface for from 3 to 5 minutes followed by wiping with a wet towel and then drying with a clean towel prior to welding.

For the purpose of the aqueous secondary cleaner of the present invention, a deoxidizer in the form of a weak water soluble organic fruit acid of low concentration such, for example, as citric acid is employed together with an emulsifier in the form of a water soluble glycol of low concentration such, for example, as triethylene glycol, it being significant that glycols in general are used in or for medicinal purposes. These materials in combination constitute a deoxidizer and surface cleaner and thus do not require a pre-cleaner as in the case of the prior art secondary deoxidizers which actually are etchants. The citric acid in the present solution is not considered an etch since it attacks only the surface oxides and not the basic metal and thus is active only as a deoxidizer. The citric acid is completely effective as a deoxidizer in this manner only where the material treated has previously been cleaned by a primary etchant. Accordingly, in use, the manufacturer specifies and cautions that the composition of the present invention is not to be used as a primary cleaner. The triethylene glycol emulsifies the oils present on the surface of the metal, and a suitable non-ionic alkylphenoxy polyethoxy ethanol wetting agent such as Triton X100 is employed to bring both the emulsifier and the citric acid into more intimate contact with the surfaces to be acted upon. There are thus provided three ingredients in a single solution which effectively fully wets the area to be acted upon, or treated, and also deoxidizes and cleans this surface area simultaneously, such that the oxides, greases, oils, and other surface contaminants may be wiped off in a single operation. A film remains which is mainly citric acid and by reason of its reducing power will prevent subsequent reoxidation of the surface area.

An optimum secondary deoxidizer solution comprises the following components and proportions:

Citric acid (monohydrate) _____ 5 to 15% by weight (deoxidizer).
Triethylene glycol _____ 2 to 10% by volume (emulsifier).
Triton X100 _____ 0.5 to 1.0% by volume (wetting agent).
Water (demineralized) _____ Balance.

In lieu of the citric acid, any one of the water soluble "so called" organic fruit acids such as acetic, malic, malonic, oxalic and tartaric acids may be used as the deoxidizer. The emulsifier, as aforementioned, may be any of the water soluble glycols. The wetting agent may be selected from the well known series or class of non-ionic wetting agents of alkylphenoxy polyethoxy ethanol of which Triton X100 is a commercially designated example.

In its simplest form, the process of the present invention contemplates use of the foregoing secondary deoxidizer composition at ambitent temperature and under the following recommended operating conditions and steps.

Preliminary step(s). Wipe the surface of the metal to be treated with paper toweling to remove loose dirt, oils, etc.

Deoxidizing step(s):

(1) Apply a film of the deoxidizer solution with a swab to the surface to be treated.

(2) After from 3 to 5 minutes, wipe the surface dry with paper toweling.

Materials listed in the following table were cleaned in a primary pre-spot weld etch in production tanks and subsequently stored until the surface resistance exceeded 100 microohms. The secondary deoxidizer solution of the present invention was then applied and the surface resistance again measured to confirm reduction below 100 microohms. The materials, then being readied for welding, were spot welded in accordance with commercial certifications for the specific material combinations listed. Little or no difference in electrode tip life was observed with respect to parts welded after the primary cleaning operation and those welded after the secondary cleaning operation. The spot welding results indicated in the table meet commercial requirements, and the materials tested manifested no color contrast in relation to the areas treated. There was, moreover, no evidence of pitting or corrosion.

| Material | Thickness Combination (inch) | Average Ultimate Shear Strength of 20 Spot welds (lb.) | Number Within ±12½% of Average | Initial Maximum Surface Resistance (microohms) | Final Maximum Surface Resistance (microohms) |
|---|---|---|---|---|---|
| 2024-T6 Clad | 0.020/0.020 | 273 | 20 | 350 | 10 |
| 6031-T6 Bare | 0.040/0.040 | 458 | 20 | 40,000 | 25 |
| 2024-T4 Clad | 0.072/0.072 | 1237 | 19 | 250 | 10 |

The materials tested were cleaned by the secondary deoxidizer solution in accordance with the following optimum procedure:

(1) Apply the RK-3W with a sponge to the desired area of the part ensuring that the solution completely covers the area. It may be necessary to wipe over the area several times in order to ensure good wetting.

(2) Allow the solution to remain on the part for 3 minutes.

(3) Remove the solution with a paper towel dampened in water.

(4) Dry the area with a dry paper towel, but do not rub vigorously. Slow-even strokes will absorb the excess water more effectively.

From the foregoing, it should now be apparent that there has been provided a secondary deoxidizer composition and method for applying the same to the surfaces of aluminum and its alloys to reduce the electrical surface resistance thereof to or below acceptable pre-spot weld values previously achieved thereon in the use of a primary cleaner, and to otherwise fulfill the requirements for a fully satisfactory hand cleaner as set forth in the aforestated objects of the invention.

It will be understood, moreover, that the invention may be embodied in other forms or carried out in other ways without departing from the spirit or essential characteristics thereof. The present hereinbefore disclosed method and composition of the invention are therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The secondary method of cleaning the oxide coating and grease and oil contaminants from a pre spot weld surface area of aluminum and its alloys which comprises the steps of applying by hand to said surface area a non-toxic, non-etching, aqueous secondary deoxidizer solution operating at ambient temperature of the order of 65° to 90° F. and consisting of from 5 to 15% by weight of citric acid, from 2 to 10% by volume of triethylene glycol, from 0.5 to 1.0% by volume of a non-ionic alkylphenoxy polyethoxy ethanol wetting agent, and the balance demineralized water, allowing said solution to remain on said surface area for a period of from 3 to 5 minutes, and at the end of said period removing said solution with a water-dampened towel, and drying said surface area with a dry towel and in a wiping action sufficient to remove said solution except for a remaining protective film of said acid.

2. A hand-applied, non-toxic, non-etching, equeous secondary deoxidizer solution applicable at ambient temperature of the order of 65° to 90° F. for cleaning the oxide coating and grease and oil contaminants from a pre spot weld surface area of aluminum and its alloys consisting of

| | |
|---|---|
| Citric acid (monohydrate) | 5 to 15% by weight. |
| Triethylene glycol | 2 to 10% by volume. |
| Non-ionic alkylphenoxy polyethoxy ethanol wetting agent | 0.5 to 1.0% by volume. |
| Water (demineralized) | Balance. |

References Cited in the file of this patent

UNITED STATES PATENTS

| | | |
|---|---|---|
| 2,326,837 | Coleman | Aug. 17, 1943 |
| 2,629,696 | Dodd | Feb. 24, 1953 |
| 2,710,792 | McDonald et al. | June 14, 1955 |
| 2,430,435 | Sperry | Nov. 4, 1957 |
| 2,942,956 | Kelly | June 28, 1960 |
| 3,003,896 | Kendall | Oct. 10, 1961 |
| 3,003,898 | Reich | Oct. 10, 1961 |

DONALL H. SYLVESTER, *Primary Examiner.*
EARL M. BERGERT, *Examiner.*